United States Patent [19]
Mailvaganam et al.

[11] Patent Number: 5,472,607
[45] Date of Patent: Dec. 5, 1995

[54] HOLLOW FIBER SEMIPERMEABLE MEMBRANE OF TUBULAR BRAID

[75] Inventors: Mahendran Mailvaganam, Hamilton; Luigi Fabbricino, Burlington; Carlos F. F. Rodrigues, Brampton; Allen R. Donnelly, Mississauga, all of Canada

[73] Assignee: Zenon Environmental Inc., Burlington, Canada

[21] Appl. No.: 170,033

[22] Filed: Dec. 20, 1993

[51] Int. Cl.⁶ .......................... B01D 29/00; B01D 39/00
[52] U.S. Cl. .............. 210/490; 210/500.23; 210/500.29; 210/500.3; 210/500.36; 210/500.41; 210/506; 428/246; 428/248; 427/245
[58] Field of Search .......................... 210/490, 500.23, 210/500.27, 500.29, 500.3, 500.41, 500.36, 506; 428/246, 252, 304, 248; 427/340, 245; 138/125

[56] References Cited

U.S. PATENT DOCUMENTS

| | | | |
|---|---|---|---|
| 3,674,628 | 7/1972 | Fabre . | |
| 3,762,566 | 10/1973 | Del Pico | 210/490 |
| 3,850,203 | 11/1974 | Shobert | 210/490 |
| 4,061,821 | 12/1977 | Hayano et al. | 428/304 |
| 4,387,024 | 6/1983 | Kurihara et al. | 210/490 |
| 4,894,157 | 1/1990 | Johnson | 210/490 |
| 4,943,475 | 7/1990 | Baker et al. | 428/246 |
| 5,034,129 | 7/1991 | Ten Hove | 210/490 |
| 5,039,421 | 8/1991 | Linder et al. | 210/490 |
| 5,141,642 | 8/1992 | Kusuki et al. | 210/490 |

OTHER PUBLICATIONS

Roselle et al. "Development of New Reverse Osmosis Membrane for Desalination", Research & Development Report No. 359, Oct. 1968.

*Primary Examiner*—Ana M. Fortuna
*Attorney, Agent, or Firm*—Alfred D. Lobo

[57] ABSTRACT

A hollow fiber membrane ("fiber") comprises a tubular macroporous support coated on its outer surface with a thin tubular asymmetric semipermeable film of polymer. The film, by itself, is non-self-supporting. The support itself is so flexible (flaccid) that it does not have a circular cross-section and collapses with finger pressure. Such a tube of knitted or woven braid no greater than 2.5 mm o.d., having interstitial voids which are non-uniformly shaped by the "ends" which are braided, is coated with a "dope" of polymer, then coagulated in a bath to form the film. Yet, after coating, the braided membrane can withstand up to 1500 psig in hydraulic compression forces before a straight-line relationship between flux and pressure begins to flatten out. The voids are relatively much larger than pores in the film. These voids are small enough to inhibit substantial penetration of the dope which lies superficially supported on the upper portion of the braid. Viewed in an elevational cross-sectional view looking down the longitudinal axis of the dope-coated braid, the dope extends over less than 33% of the outer portion of the braid's cross-sectional area. This thin coating of dope is made possible by a unique coating nozzle having sequential rounding and sizing orifices through which the braid is advanced by pulling it without unduly distorting the shapes of the voids in the braid. The shapes and sizes of the braid are thus retained except that the braid is distended into an essentially circular shape because of the tensile forces exerted by the coagulating dope. Hollow fiber membranes made as disclosed herein are used to make fluid-fluid separations, the braid and film being tailored to the purpose at hand.

11 Claims, 4 Drawing Sheets

HOLLOW FIBER SEMIPERMEABLE MEMBRANE OF TUBULAR BRAID

BACKGROUND OF THE INVENTION

This invention relates to a hollow fiber membrane (or "fiber" for brevity) formed on a tubular macroporous support. A thin tubular film of polymer on the cylindrical surface of the support, by itself, is non-self-supporting. The term "membrane" is used to refer to the hollow fiber membrane in its entirety, that is, the tubular film with the tubular macroporous support. A particular example of such a membrane is a tube of knitted or woven braid coated with the tubular film. In the art, a tube of braid having a nominal inside diameter of less than 2.5 mm, coated with a semipermeable film of polymer is referred to as a "hollow fiber membrane" or fiber. For the sake of clarity, reference to the film, by itself, is made with the term "film membrane", or "thin film" or "film" for brevity, since without the film there would be no membrane. Since the braid has macropores which are very large relative to pores within the film, they are referred to herein as "voids".

The non-supporting thin film is formed superficially on a tubular braid when a "dope" of a synthetic resinous material is coated on the outer circumferential surface of the braid without embedding the braid in the film. By "non-self-supporting" is meant that, even a short length of the tubular film, no more than about 10 cm long, extruded or otherwise formed with a circular cross-section, cannot support its own weight yet retain its circular cross-section. A tube having an inside diameter (i.d.) of 2.5 mm may be formed by either spinning a viscous solution of a polymer in an appropriate solvent ("dope") through a spinning nozzle having a circular rounding orifice of the appropriate size and passing a fluid through the axial bore of the nozzle to produce the bore of the tube; or, by forming the tube on a mandrel then collapsing the mandrel. However formed, because the tube of non-supporting film has such a thin wall, in the range from 0.01 mm to 0.09 mm thick, the tube will collapse unless supported by fluid. If a thin sheet of film 0.09 mm thick is either extruded or cast, a piece of the film in a small square 10 cm on each side, has so little strength that, by itself, it cannot be manually or mechanically manipulated without being damaged. Yet, and perhaps, more because of, its very thin cross-section and non-self-supporting nature, such a film, derived from the synthetic resinous material provides a semipermeable film having excellent semipermeability properties so long as the film is suitably deployed, and, a geometry favored by the film, is maintained.

If suitably adapted to satisfy the necessary criteria, the thin film will separate alcohol from a broth containing finely dispersed solids and live cells of microorganisms in the range from about 1µ to 44µ or larger in a microfiltration (MF) module, as described in detail in U.S. Pat. No. 5,250,182 to Bento et al; or, purified water from brackish water in a combination of ultrafiltration (UF) and reverse osmosis (RO) operations to produce potable water, as described in detail in U.S. Pat. No. 5,244,579 to Horner et al.

The problem was to find the conditions under which the film could be deployed. The physical solution lay in finding how to support the thin semipermeable film, less than 0.2 mm thick, preferably less than 0.1 mm thick, to provide an effective hollow fiber membrane in a practical application such as in the MF and UF of a fermentation broth to produce a permeate of aqueous alcohol and a concentrate of broth containing the sugar-containing components thereof, along with the microorganisms used in the fermentation; or, in the nanofiltration (NF) and reverse osmosis ("RO") of brackish water.

Semipermeable composite membranes are old in the art, and are also referred to as "reinforced semipermeable membranes". Such reinforced membranes are referred to in U.S. Pat. No. 4,061,821 to Hayano et al (the '821 patent, for brevity); in U.S. Pat. No. 3,850,203 to Shobert (the '203 patent, for brevity); and, in U.S. Pat. No. 3,644,139 to Schwarz (the '139 patent). In each of the references is taught a self-supporting film which is further reinforced with a fibrous material.

Specifically the '821 patent teaches both a sheet or flat membrane as well as a hollow fiber membrane of polyacrylonitrile, or, a copolymer of acrylonitrile and methyl acrylate which by itself was used by Hashino et al in U.S. Pat. No. 3,871,950 because of its "much greater water-permeability than the conventional products, a large mechanical strength, few clogging (sic), and capability of performing continuous filtration operation for a long period of time with the same material, a high chemical stability and a superior resistance to microorganisms." (see col 2, lines 13–17). Copolymers had been used by Schwarz in the '139 patent, to coat both sides of a cellulosic sheet of paper thus stabilizing the polymer with the cellulosic sheet.

But Hayano et al found that with any semipermeable membrane, there is a "restriction in the actual use because the water permeability is extremely reduced and/or the shape of membrane cannot be maintained when they are brought into contact with hot water or they are dried." (see col 2, lines 50–54). With particular regard to hollow fiber membranes such as were disclosed in U.S. Pat. No. 3,674,628 to Fabre, and those of Hayano et al and Hashino, though suffering from the stated limitation, were, for their purpose, highly satisfactory semipermeable membranes.

Thus, the '821 reference provided "a fabric as reinforcing material in case of flat type, and a braid having a central hollow portion as reinforcing material in case of hollow fiber type." (see col 2, lines 6–9). In each case, the flat fabric or tubular braid reinforcement provided a network of openings referred to herein as "voids" in the reinforcement which was embedded in the membrane so as to fix the polymer membrane within the openings. By using the fabric or braid for reinforcing the membrane against rupture and inadvertent damage, the mechanical strength and stability under pressure of the hollow fiber membranes was enhanced by the fibrous reinforcing material.

When a thick tubular membrane was formed, superficially coating the surface of the tubular braid, the stabilizing effect of the openings in the reinforcing material was lost, as stated by Hayano et al, in the sentence beginning at the bottom of col 4, and bridging cols 4 and 5 (near the top), and their reinforced membrane was not an effective membrane.

In view of the specific teaching of Hayano et al that a tubular braid only superficially coated with a membrane film (film membrane) is not a desirable embodiment for a semipermeable membrane, it was particularly unexpected to find that, within the limits stated herein, the semipermeable membrane of this invention is a highly effective one.

It is recognized that flux through a membrane (and flow of permeate) is maximized, when the membrane is made as thin as possible. If such a membrane is to be used to produce a continuous flow of permeate under substantial pressure difference sufficient to provide continuous flow, it is the received wisdom in the art to reinforce such a thin membrane against rupture. This is typically accomplished with a reinforcing means in contact with the membrane, the reinforcing means perforce extending over a relatively large portion of the membrane if the transmembrane fluid pressure difference is relatively large. The presence of a reinforcing means over such a large area thus significantly reduces the effective bare area of the membrane in contact with fluid on the low pressure side of the membrane. It also undesirably reduces the area of the membrane from which permeate can flow unobstructedly away from the membrane; and, rinse fluid can flow unobstructedly against the membrane. Additionally, such a reinforcing means typically provides dead spots where fluid flow rate is reduced causing concentration polarization. Both phenomena reduce the effective flux through the membrane. Thus, using a tightly woven braid for reinforcement would certainly appear to be at cross purposes with using an asymmetric thin film membrane. Even without Hayano et al's specific teaching that overlying a braid with a membrane, irrespective of its thickness, or whether the membrane had a proclivity to shrink, it seemed fatuous to expect that their teaching missed the mark.

Based on the received wisdom, Caro et al in U.S. Pat. No. 4,787,982 placed their "flaccid" reinforcement on the outside of their asymmetric thin film membrane, not the inside. By "flaccid" is meant that the denier of monofilaments used in the yarns or "ends" for carriers which are braided, and the number of picks/unit length of the braid, are such that a tubular braid has very little mechanical strength in a vertical plane normal to its longitudinal central axis, so that is so flexible that it can be easily manually tied into a knot. A typical braid starts out as multiple filaments which make up a single "end" and two "ends" are plied together in 3.8 twists/25.4 mm to make up a yarn or "carrier". Multiple carriers, preferably 24, are used to braid a tubular braid.

From a different physical viewpoint, a tubular braid having an i.d. of about 2 mm, when viewed resting longitudinally on its cylindrical surface under a microscope, does not present a geometrically cylindrical cross-section. The upper portion of the tubular braid sags indicating the cross-section is asymmetrical and that the wall of the tubular braid, in cross-section has very little rigidity. As the diameter of the braid decreases, there is progressively less sag, but even a tubular braid having an inside diameter as small as 0.25 mm is so flexible that it will be depressed to the point of near-collapse, under light finger pressure, no more than about 0.25 lb-force. Yet, after the dope is coagulated on the braid to form the film, the hollow fiber membrane formed can withstand a hydraulic pressure high enough to permit its use as a RO membrane, typically up to at least 12,500 kPa (1800 psig).

As will presently be evident from the data presented, both Hayano et al and Caro et al missed discovering the essential physical facts.

The function of the braid in Hayano et al is clearly that of a reinforcing support which tends to negate the shrinkage otherwise known to occur with such a membrane film; and, the function of the supporting braid is to stabilize the network of pores in a polymer film by-embedding the braid in the polymer which is peculiarly susceptible to the shrinkage problem. However, a thick-walled film for a film membrane in which is the braid is embedded, reduces available membrane surface area and the thick membrane wall is directly responsible for reduced permeation. Since Hayano et al were mainly interested in a pervaporation membrane which was to operate at elevated temperature where the pores of an acrylonitrile-containing film shrunk, they were willing to sacrifice flux for the ability to use a material which was inert to the fluids in which it was to be used. Under the circumstances, it did not matter to Hayano et al whether the polymer is coagulated from the inside of the braid or the outside, as long as the pores of the membrane were kept open, and this was accomplished when the braid is embedded in the film formed. The function of the braid in Hayano et al was to provide a stable network of reinforcing carriers which negated shrinkage of the pores in the film. To make our film supported on the outer surface of a tubular braid having an essentially circular cross-section, referred to herein as a "braided membrane", the dope can only be coated onto the outer surface of the braid, and the dope-coated braid is contacted only from the outside with a coagulant. The bore of the braid remains uncoated.

Neither was there any teaching in Hayano et al as to which materials in filament form could be spun into "ends" which would provide the necessary adhesion with any particular generic class of polymers. In general, membranes formed by embedding a braid in a polymer, upon being used, result in the polymer becoming detached from the braided carriers ("peeling"). For example, a polysulfone film peels off a braid of Kevlar aromatic polyamide fibers. Most significantly, the prior art recognized that polymers which contained a repeating unit derived from acrylonitrile provided a useful pervaporation membrane at about 80° C. when the braid was embedded in the membrane, but failed to realize that such polymers were unusable as/ton-self-supporting semipermeable membranes when supported superficially on a tubular support having interstitial voids.

The thin film used herein, by itself, cannot be used as a semipermeable membrane in any practical sense. Further, except in the instance when a substantially rigid braid is used (for example one woven from relatively stiff carbon or graphite fibers, as opposed to a highly flexible braid woven from very flexible carbon fibers), the tubular braid typically used is flaccid.

With so little mechanical strength in a vertical plane normal to its longitudinal central axis, it appeared unlikely that such a braid might provide a tubular platform upon which to cast a membrane and afford a desirable braided hollow fiber membrane. There was no logical reason to expect that, supported by the tubular platform, the braided hollow fiber membrane may be operated for MF or for UF under a vacuum drawn on the "lumens" (bores of the fibers) in the range from 1 mm to about 100 mm of Hg, and under an overall differential in hydrostatic pressure in the range from about 110 kPa to 300 kPa for MF flow, from about 300 kPa to about 690 kPa for UF flow, and from 690 kPa to about 7000 kPa for NF or RO flow, the highest differentials being for RO flow.

A plausible explanation of what occurs when the tubular braid is coated with a thin film of the semipermeable membrane, without embedding the braid in the membrane, is that the forces generated within the polymer film, as the film is formed from solution, tend to distend the tubular braid and maintain its circular cross-section under tension. As solvent for the polymer is removed the tensile forces exerted are high enough to distend the braid into an essentially right cylindrical shape, and this circular cross-section of the coated braid is maintained even under high pressure differential, during operation.

SUMMARY OF THE INVENTION

It has been discovered that a non-self-supporting film of semipermeable membrane which can withstand no compression pressure exerted over its surface, when formed by coating a thin semipermeable film, superficially onto a "flaccid", foraminous tubular support which can withstand only insignificant compression pressure without collapsing, results in a highly compression-resistant self-supporting hollow fiber membrane.

It has further been discovered that a tubular support with voids much larger than the pores in a semipermeable thin film membrane, but small enough to support a dope of polymer on the support's circumferential surface without the support being embedded in a film formed from the dope, provides an excellent hollow fiber membrane. A preferred support is a tubular network structure, or a tube formed with multiple carriers, namely a tubular braid. The braid is woven or knitted to form a highly flexible or flaccid tube having an nominal i.d. no larger than about 2.5 mm, typically in the range from 0.25 mm—2.0 mm. When such a tube is superficially coated with a thin film of a synthetic resinous semipermeable material no thicker than about 0.2 mm, the combination of "tube-on-braid" produces an effective hollow fiber membrane. The braid is formed from an "end" having a diameter smaller than 0.5 mm, typically in the range from 0.05–0.5 mm, with interstitial voids (or macroscopic interstitial pores) in the braid, the voids having nominal diameters ranging from about 10 µm to about 400 µm, preferably from 10 µm to about 100 µm, between contiguous "ends" which form a grid the "tightness" of which is quantified by the number of "picks/inch" or "picks/25.4 mm". The braid, before being distended by the formation of the film on it, provides a non-circular platform upon which the film is supported without the braid being embedded in the film; and the film stabilizes the grid upon which the film is adherently bonded, preferably self-adherently, so that the nominal diameters of the interstitial voids remains in the stated range of 10 µm–100 µm when the braided membrane is placed in service. The braid-supported tubular film is used to separate a desired liquid from micro: scopic organic and/or inorganic matter in a liquid medium containing the desired liquid, or to separate a gas from a liquid, utilizing a substantial pressure difference without collapsing. This difference between the pressures outside and inside the membrane, may be as much as 10,000 kPa.

The solution to the problem of finding a practical way to employ a non-self-supporting film of a polymer, useful as a semipermeable hollow fiber membrane, is to support a thin-walled tube of the film circumferentially on the surface of a tubular braid having a nominal wall thickness at least as thick as the film, and preferably from 2 to 10 times thicker, so that the film is supported circumferentially and superficially upon the braid, without embedding the braid in the film. At least the portion of the braid near its inner radius is essentially free of a polymer coating; more preferably, a major portion of the area of the circular cross-section of the coated braid, viewed along the longitudinal central axis, is free from film; and, most preferably, the film is supported on the outer surface of the braid, on that outer portion which extends over less than 33% of the cross-sectional area of the braid.

It is therefore a general object of this invention to provide a hollow braided membrane to be used in outside-in flow, where the feed is on the outside of the membrane and the permeate is withdrawn into its lumen. The braid before being coated is highly flexible and slightly asymmetric (which is unrelated to the asymmetry of the thin film membrane to be formed on it) due to being formed with "voids" non-uniformly shaped by the braided "ends" or yarns. The voids are small enough to inhibit substantial penetration of a dope from which the film is formed. The tubular braid provides a base for an otherwise non-self-supporting tubular semipermeable film having a wall thickness no greater than 0.2 mm, for use in outside-in flow. The film is formed from an essentially non-contracting semipermeable synthetic resinous polymer substantially free of acrylonitrile repeating units. The tubular film has an ultrathin barrier layer or "skin" extending over the tube's outer cylindrical surface, and underlying the skin, is a "spongy" layer comprising successive (in a radially inward direction) circumferentially integral microporous annular layers with intercommunicating pores, each layer contiguous with a preceding layer. As will readily be understood, the thickness of skin and each layer will vary from one membrane to another, depending upon the primary purpose of the membrane, whether for MF, UF, NF or RO, the particular polymer being used, and other factors.

In general, the skin is in the range from about 50 Å to 5 µm thick, preferably from about 200 Å to 2 µm thick. The layers include an outer layer, an intermediate transport layer, and an inner layer. The pores grow progressively larger as one proceeds from the outer layer next to the skin, to the inner layer next to the braid. The outer layer has pores in the range from about 100 Å to 2µ, preferably mostly submicron size (<1 µm) pores in the range from about 100 Å to 1µ, though some may be larger. This outer layer overlies an intermediate layer having pores in the range from about 0.15 µm to about 7 µm preferably from 0.2 µm to about 5 µm, believed to be present in a normal statistical distribution. The intermediate layer in turn, overlies an inner layer of pores having diameters in the range from about 5 µm to about 300 µm, preferably from 10 µm—200 µm also believed to be present in a normal statistical distribution. The inner layer of the film has its inner peripheral surface supported on the braid.

It is a specific object of this invention to provide a flexible hollow fiber membrane of arbitrary length, having an essentially circular cross-section, and a wall thickness in the range from 0.01 mm to 0.09 mm, circumferentially, superficially supported on, and distending a flaccid tubular non-circular braid of a relatively loose network structure or weave, preferably knitted or woven, having a nominal inner diameter in the range from about 0.3 mm to about 2.5 mm. A braided membrane resists collapse under a hydraulic pressure in the range from 240 kPa to 10,000 kPa, yet the tubular braid or perforated net, by itself, before being coated to provide support for the membrane, is collapsed by a force as small as 50 gm-force, or by pressing one's finger down upon the braid.

It is also a specific object of this invention to provide a unique coating nozzle which coats a dope substantially uniformly over the surface of a wall of a tubular support with relatively large voids in relation to pores in the film to be formed, without permitting the wall of the film, when formed, to be embedded in the support. The nozzle ensures that the emerging braid or other support coated with dope has a geometrically essentially circular cross-section which is maintained by tensile forces generated in the coagulating film when the coated support is immersed in a coagulation bath.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
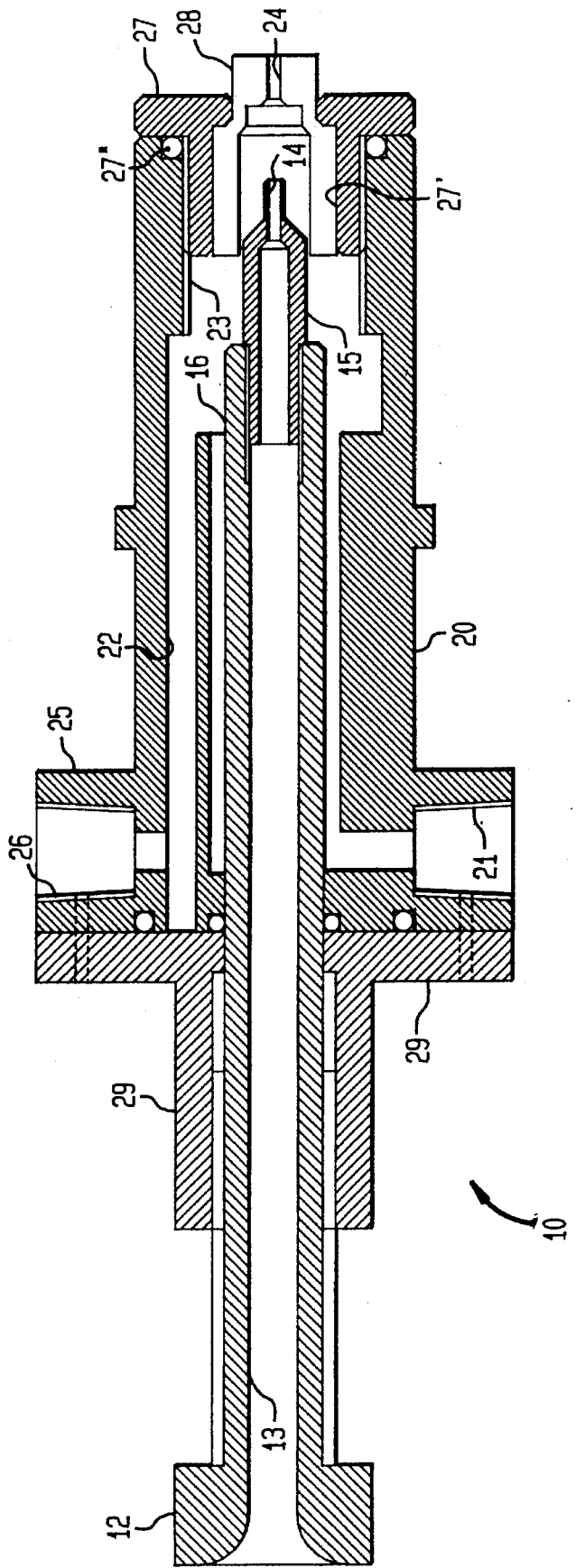
FIG. 1 is a cross-sectional elevational view along a longitudinal axis, of a coating nozzle used to form the thin non-supporting film membrane on the braid.

Though for purposes of the description of the best mode of making and using the invention, a flaccid tube of braided carriers insoluble in the dope to be used, is most preferred, other flaccid tubular supports with voids may also be used so long as the material from which such supports are formed, provides apt adherent properties for the polymeric film membrane ("film"). The voids place the outside surface of the film in restricted fluid communication with the inside surface of the braid. Voids which are smaller than about 10 μm tend to interfere with the flux, and those larger than 100μ tend to have the film penetrate the voids and hang too far down over the yarn forming the voids. Voids which are too large also negate the surprising strength of the film membrane. Instead of being woven as a tube, a fabric may be formed into a tube. Whether the fabric is knitted, braided, woven, non-woven or simply perforated, it may be used, since in each case, such a tube provides a foraminous tubular support with the desired voids or macropores. Netting or mesh fabric such as is known in the trade as cubicle netting 22/1000 made by Frankel Associates of New York, N.Y. of 210 denier nylon, warp-knitted by the Raschel knitting process, such as is used in the '982 membrane to surround the film, may be used provided the voids are not too large, as specified herebelow for MF or UF use, and the fabric (material) is inert to the liquid it is immersed in and the contaminants it contacts.

The polymer from which the film membrane is formed may be any fully reacted polymer or copolymer free of a repeating unit derived from acrylonitrile, and known to afford a semipermeable membrane when formed into a thin film less than 0.2 mm thick in cross-section. By "fully reacted" is meant that the polymer does not undergo chain extension or cross-linking at any stage during its being coated on the braid's surface. Such polymers are polysulfones, sulfonated polysulfone, each having a number average molecular weight lower than $10^6$ (1,000,000), preferably less than 100,000; blends of polysulfones and sulfonated polysulfone, polyether sulfone, polyether ether ketone, cellulose acetate, cellulose nitrate, cellulose butyrate, polystyrene, and fluoropolymers such as poly(vinylidene difluoride) (PVDF) and poly(vinyl fluoride) and blends of one fluoropolymer with another.

The polymer used for the thin film herein is preferably water insoluble since it is generally for use in an aqueous medium. It is also preferred that the polymer be relatively acid-resistant and alkali resistant. However, if for example, it is known that a light hydrocarbon such as an olefins e.g. propylene and/or paraffins, e.g. butane, is to be separated from a mixture of cyclic and acyclic long chain $C_8$–$C_{16}$ hydrocarbons, the polymer may be water-soluble but not soluble in hydrocarbons. Preferred for MF and UF are thin films with pores in the size range from 10–50 μm. For NF and RO separations, smaller pores are used.

The tubular braid has a central longitudinal bore and is preferably made from ends which are knitted or woven to form the tubular braid having a foraminous circumferential outer surface interrupted by a multiplicity of overlapping yarns contiguously woven into the tubular braid. The bore of the braid has a nominal inside diameter in the range from about 0.25 mm to 2.3 mm. The woven or knit braid has a wall thickness from about 0.1 mm to about 0.7 mm, preferably being in the range from 0.3–0.5 mm. The diameter of the filaments of the ends, and the way the ends are knitted or woven with from about 20 to 100 picks/25.4 mm, preferably from 5–50 picks/25.4 mm, result in a braid of arbitrary length which is highly flexible and ideally "flaccid". The outside diameter of the braid ranges from about 0.6 mm to 2.5 mm. The voids in the braid are non-uniformly shaped by the braided "carriers", the voids being small enough to inhibit substantial penetration of a dope from which the film membrane is formed. The upper portion of the tubular braid provides a continuous support for the film without the braid being embedded in the film.

The method for producing a braided semipermeable hollow fiber membrane is simple and reliable, the essential criterion being to introduce the dope into the coating nozzle at a flow rate correlatable to the speed with which the tubular braid is advanced through the rounding orifice of the coating nozzle such that only as much dope as can be supported on the outer portion of the braid, is deposited on it.

The dope is made up of film-forming polymer, a solvent for the polymer, hydrophilic additives, surface active agents and the like suitable for use as dispersants and compatibilizers in nonaqueous liquids such as alcohols. Solvents for most commonly used for polymers include sulfuric acid, N-dimethyl-2-pyrrolidone (NMP), dimethyl formamide (DMF), and dimethyl acetamide.

The dope may be a solution of polysulfone in N-methyl-2-pyrrolidone, or dimethylacetamide; or, of poly(vinyl chloride) in tetrahydrofuran; or, an aromatic polyamide in dimethylacetamide; or, of poly(vinylidene difluoride) in N-methyl-2-pyrrolidone; or, of polyether ether ketone (PEEK) in sulfuric acid.

Surfactants include Tritone, a long chain fatty acid ester of an amino-alcohol; or, Tamol 731, a sodium salt of a polymeric carboxylic acid, available from Rohm & Haas Co.; sulfonated polysulfone, polyhydroxy alcohol hydrophilic additives, and the like. A suitable surface active agent for use in an aqueous liquid is Darvan C, an ammonium salt of a carboxylated liquid polyelectrolyte available from the R. T. Vanderbilt Company.

The dope preferably has a viscosity in the range from 300 cp to about 200,000 cp at 22° C., preferably from 400 cp to 120,000 cp at 22° C., the viscosity being chosen according to the thickness of the film membrane to be deposited, and the adherent characteristics of the dope and the material from which the ends are spun.

The speed with which the braid is advanced must be less than that at which the voids in the grid of the woven membrane are distorted more than 50%, or the voids interfere with the uniformity of the film to be coagulated above them. As the tubular braid is drawn through the rounding orifice of the coating nozzle, the braid's slightly asymmetric cross-section is restored to circularity and this circularity is maintained when the dope is coagulated to form the film membrane.

Referring to FIG. 1 is a cross-sectional view of the coating nozzle indicated generally by reference numeral 10, which, in addition to limiting the amount of dope passing through the nozzle, meters the correct amount of dope over the surface, and distributes the metered amount uniformly over the surface of the braid (not shown) as it is drawn longitudinally axially through the nozzle.

The nozzle 10 comprises an inner barrel 12 having an internal bore 13 through which the braid is advanced into an axial bore 14 of a nipple 15 which is threadedly secured in the end 16 of the inner barrel 12. The bore 14 provides a rounding orifice to help the braid to acquire a circular cross-section before it is coated with dope. The rounding orifice 14 has a diameter in the range from about 1% to 10% less than the nominal diameter of the braid. The barrel 12 with the nipple 15 is inserted in an outer barrel member 20 having a cylindrical base 25. The outer barrel 20 is provided with a stepped inner axial chamber with a larger bore 22 and a smaller bore 23 provided with threads (not shown) near the end of the bore 23. A top-hat bushing 27 having a stepped axial bore 27' is threaded into the smaller bore 23 until it compresses an O-ring 27" in a groove between the end of the barrel 20 and the lower portion of the bushing. A sizing die 28 having a sizing orifice 24 is press-fitted in the stepped axial bore 27'. The sizing orifice ensures the circularity of the cross-section of finished hollow membrane, upon leaving the rounding orifice. As the dope-coated braid is advanced through the sizing orifice, it dresses the outside diameter of the polymer-coated surface to provide the dope with a desired wall thickness, which upon being coagulated, yields a thin film membrane which is no more than 0.1 mm thick.

The base 25 is provided with a lower port 21 and an upper port 26 each in open communication with the stepped bores 22 and 23, so that dope introduced into the port 21 can flow into the reservoir formed around the inner barrel 12, by the stepped bores 22 and 23, and travel longitudinally axially in the direction in which the braid is drawn through the larger bore 22, and the smaller bore 23 displacing air as the reservoir fills. When the dope having filled the reservoir flows out of the top port 26, it is plugged. The base 25 is removably secured with through-bolts (not shown) through the base 25 to a radially extending mounting flange 29 having a longitudinal body portion 29'. The body portion 29' is provided with an internally threaded axial bore so that the body portion 29' can be secured coaxially in position, aligning the rounding orifice 14 and the sizing orifice 24. By increasing or decreasing the number of turns of the body portion 29' the distance between the mouth of the orifice 14 and the orifice 24 can be varied. This distance is adjusted, depending upon the rate at which the braid is pulled through, the viscosity of the dope, and the thickness of the film of dope to be coated on the braid before it is immersed in the coagulant. In all cases, the distance is adjusted by trial and error, to provide a film of dope on the circumferential outer surface of the braid only sufficient to coat the braid superficially, and not enough to embed the braid in the film.

To draw the braid through the orifice 24 a longitudinal tension is maintained on the braid of at least 10 cN-g but not enough to distort the voids in the braid so badly that they cannot return to an equilibrium state as they are being coated with dope. Because the braid is not impregnated with the viscous polymer solution, only the outer surface of the braid is contacted with the dope so as to provide the braid with a dope- and polymer-coated outer surface.

It will now be evident that the coating nozzle 10 is a special-purpose nozzle specifically designed to provide a predetermined distance between the rounding orifice 14 and the sizing orifice 24 while a dope coated braid no larger than about 2.5 mm (nominal o.d.) is advanced through both orifices sequentially. The amount of dope metered into the coating nozzle and the rate at which the braid is advanced through the rounding orifice are determined by trial and error such as one skilled in this art is accustomed to engage in under comparable circumstances.

After the dope-coated braid leaves the sizing orifice, it is led into a coagulating bath, typically under and over a series of rolls, so that the liquid coagulant held in the bath contacts the entire circumferential surface of the coated braid. Because the polymer is insoluble in the coagulant it does not penetrate the thin film formed and enter the lumen. Upon contacting the coagulant, the dope coagulates, yielding the desired thin film membrane. The bore of the fiber contains air at atmospheric pressure.

Figure 2:
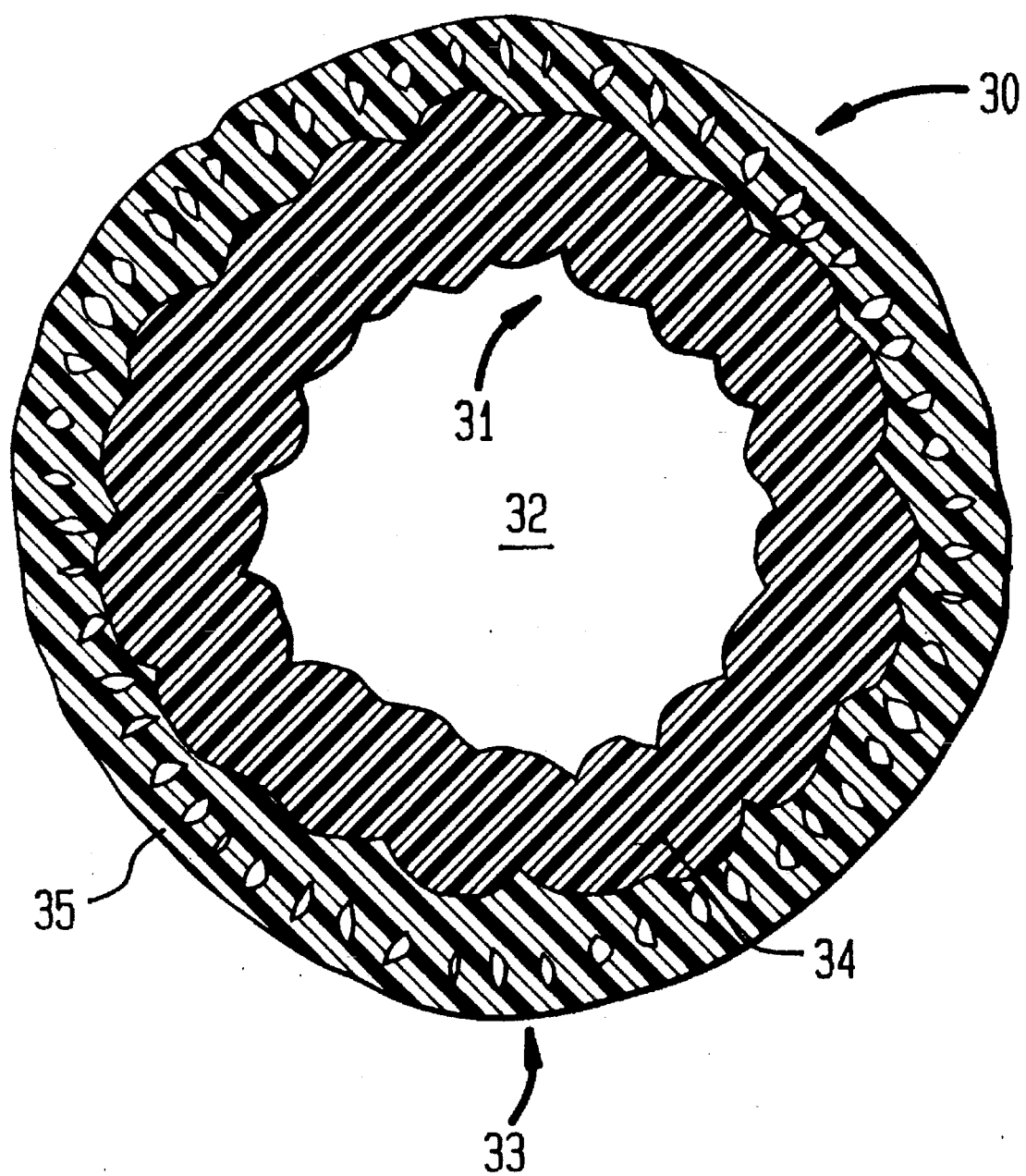
FIG. 2 is a cross-sectional end view of a hollow fiber membrane of this invention schematically illustrating the radially disposed annular zones which extend longitudinally axially over the length of the membrane, and showing how the tubular non-self-supporting film is supported on the braid without being embedded therein.

Referring to FIG. 2 there is shown in a diametrical cross-sectional view, much enlarged, a tubular braid indicated generally by reference numeral 30 comprising a braid of woven yarn 31 having a "lumen" (inner bore) 32. A thin film membrane, indicated generally by reference numeral 33, is self-adherently secured to the circumferential outer surface 34 of the braid of woven yarn 31 which is rough and uneven because it is formed by the interwoven yarn which, in the range of thickness used and the number of picks in which it is woven, does not result in an even surface. The essential characteristic of the thin film membrane 33 is that it is supported superficially, on the circumferential surface of the tubular braid without the braid becoming embedded in the thin film. This characteristic is evident in a photomicrograph which clearly illustrates that the circumferential inner surface of the tubular braid's bore 32 is essentially free of polymer.

Figure 3:
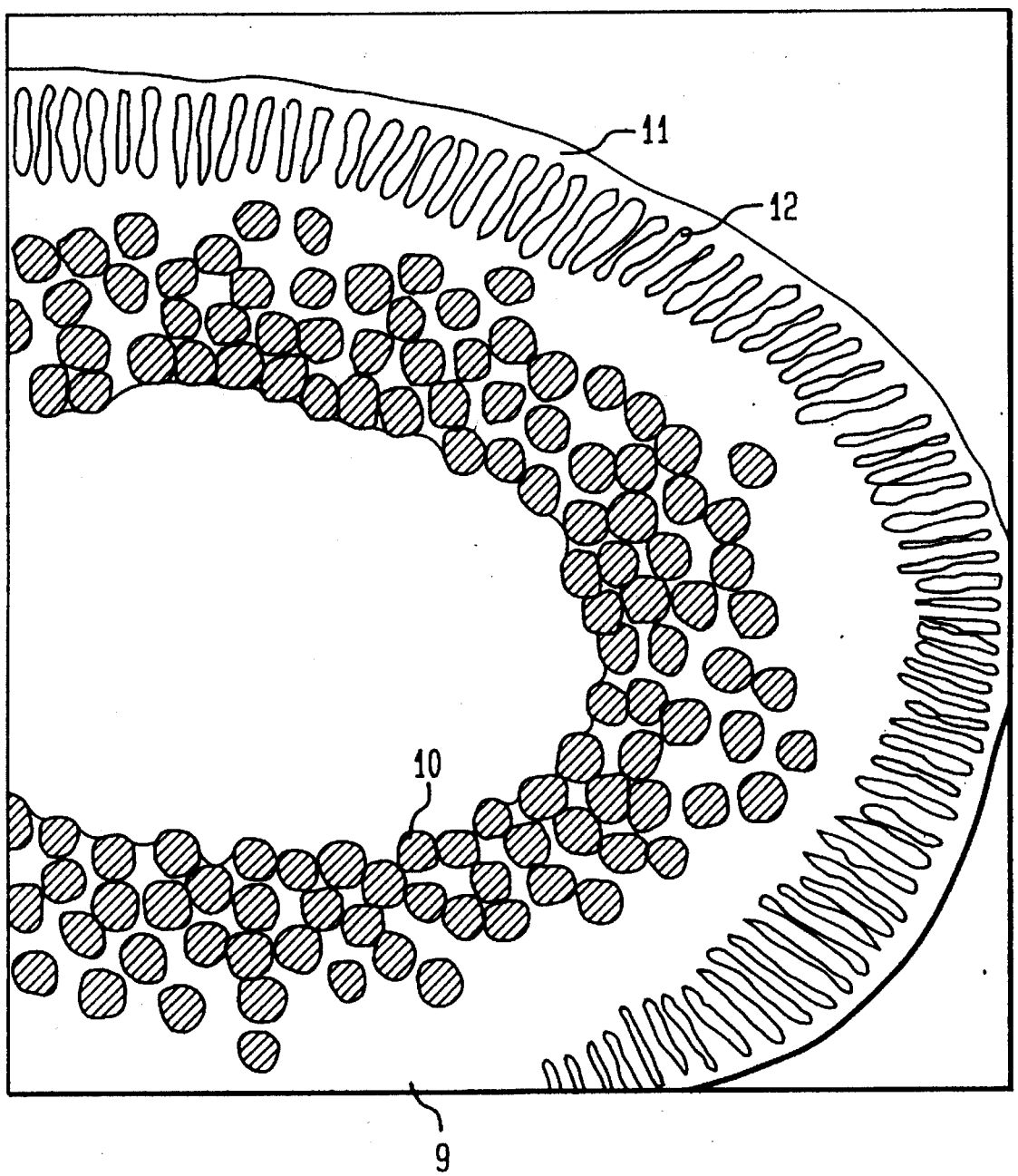
FIG. 3 is a cross-sectional end view of a semipermeable composite hollow fiber membrane disclosed in Hayano et al, schematically illustrating the prior art embedded braid which reinforces and stabilizes the tubular film of polymer so that shrinkage of its network of pores is minimized.

Referring to FIG. 3 for comparison with FIG. 2, there is shown, the schematic illustration of the reinforced braid taught by Hayano et al, much enlarged, coated with a "thick membrane formed on a bulky braid (10) having a central hollow space", a porous region 9 having voids, "and 11 shows the surface contacting with a coagulation bath and a gradient type porous region is formed" (col 4, lines 57–65). As illustrated, the yarn has been fully penetrated by the polymer and is therefore said to be impregnated by the polymer. As stated by Hayano et al, such impregnation does not provide the beneficial results of the other embodiments disclosed though "the effect of braid as a reinforcing material is recognizable to a certain extent, but when such a membrane is treated with hot water at a temperature higher than 80° C., the water permeability is reduced down to a value in the range of $\frac{1}{5}$ to $\frac{1}{8}$ the initial water permeability." (see sentence bridging cols 4 and 5).

Figure 4:
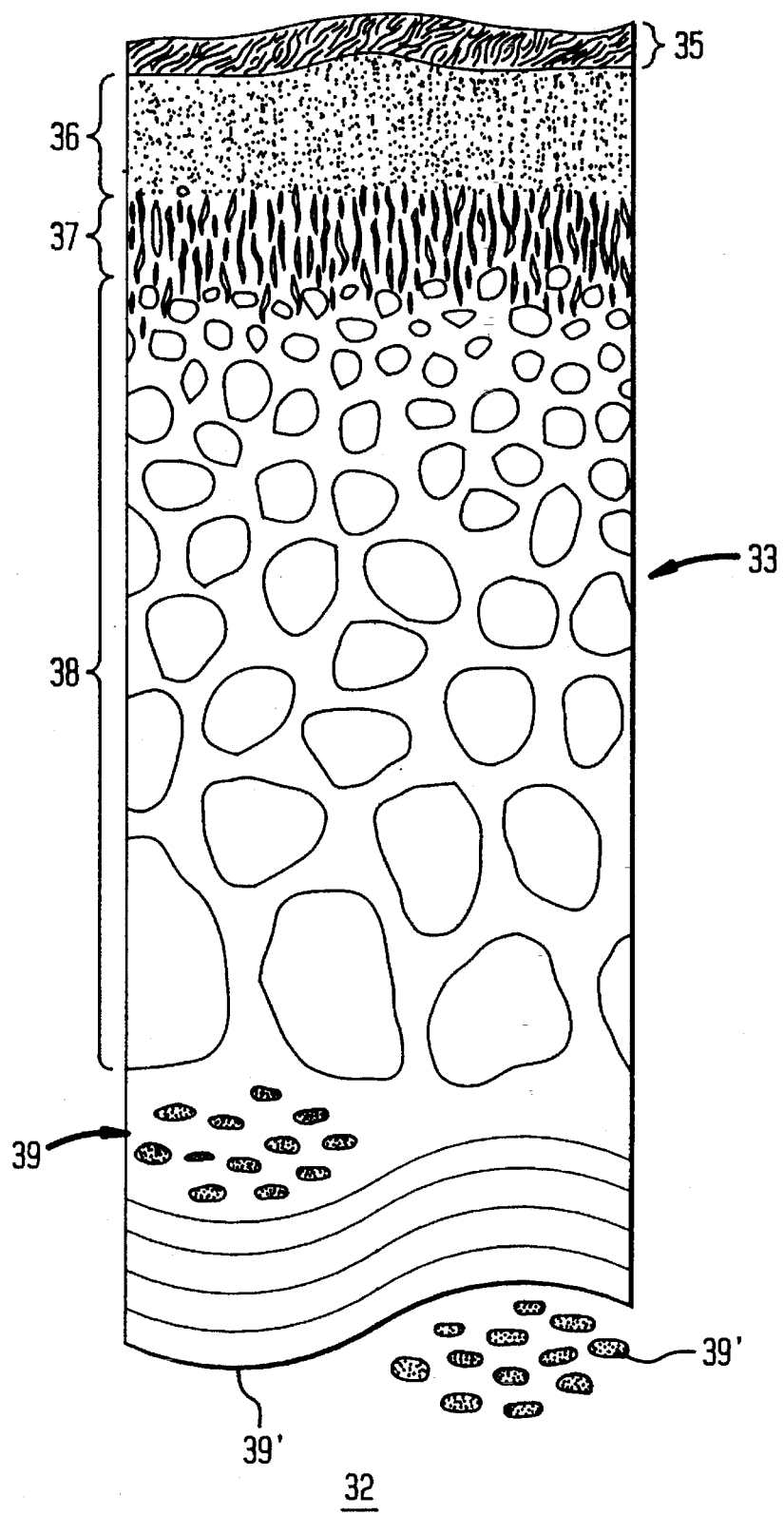
FIG. 4 is a cross-sectional view with greatly enlarged dimensions, to illustrate the dimensional relationships of pores in the component layers of the braid-supported membrane which press make the membrane so effective, particularly for microfiltration and ultrafiltration.

Referring to FIG. 4 there is schematically illustrated, more greatly enlarged than in FIG. 3, the asymmetric thin film membrane 33, which when formed by being coagulated, is itself striated into an overlying ultrathin barrier layer or "skin" 35 and three distinctly identifiable layers of pores, an outer layer 36, an inner layer 38 and an intermediate transport layer 37 between outer layer 36 and inner layer 37, as schematically illustrated in greater detail in FIG. 4. The skin is a very thin dense layer of polymer formed as the dope contacts the coagulant. By reason of the manner in which the skin and each layer is formed from the same polymer, the layers have, in a radially inward direction from under the skin to the braided yarn 39 which defines the bore 32, progressively larger pores. As shown in FIG. 4, each "end" 39 or yarn consists of a multiplicity of filaments 39', and the circumferential surface of the interwoven strands of yarn does not provide a smoothly cylindrical surface. The skin is generally thinner and the pores for a MF membrane are larger than those of a UF membrane made from the same polymer. The measured skin thickness (by electron microscopy) for particular films made for the braided membrane, is given below to appreciate its thickness in relation to the pores of the layers. The pore sizes in each layer is even smaller in a RO membrane (not measured). The approximate ranges of sizes of the pores for preferred MF and UF membranes are given below:

TABLE 1

|  | MF, μm | UF, μm |
| --- | --- | --- |
| Skin 35, thickness | 0.1–1.5 | 1–4 |
| Outer layer 36, avg pore diam | 0.5–1.0 | 0.5–2 |
| Intermediate transport layer 37* | 2–6 | 5–10 |
| Inner layer 38, avg pore diam | 10–40 | 10–150 |

*average pore diameter

In membranes, in general, the thickness of the skin is small relative to the thickness of the layers. The skin is thicker in a UF membrane than in a MF membrane, and it would be even thicker in a RO membrane (not measured). Though FIG. 4 is not to scale, by reason of the manner in which the membrane is formed, the thickness of the outer layer is generally smaller than that of the transport layer, which in turn, is not as thick as the inner layer.

The approximate thickness of each layer in a MF and UF braided membrane are given in the following Table 2.

TABLE 2

| Thickness, average | MF, μm | UF, μm |
| --- | --- | --- |
| Skin 35, | 0.1–1.5 | 1–4 |
| Outer layer 36 | 5–10 | 20–40 |
| Intermediate transport layer 37 | 30–50 | 40–80 |
| Inner layer 38 | 100–1000 | 100–1000 |

The foregoing illustrative values extend not only to flaccid supports but also to relatively rigid supports, e.g. braid made of carbon fiber. "Ends" range in mm. dia. from about 0.05 mm to 0.5 mm, preferably 0.165 mm–0.302 mm.

The following illustrative examples are provided to demonstrate how the braided hollow fiber membrane is made, and how it is used in microfiltration, ultrafiltration, nanofiltration and reverse osmosis applications.

EXAMPLE 1

Making the hollow fiber membrane of tubular braid—a MF membrane

A solution of poly(vinylidenefluoride) (PVDF) in N-methyl-2-pyrrolidone (NMP) containing a polyhydroxy alcohol hydrophilic additive and having a viscosity of 38,000 cps is fed to a nozzle through which a tubular braid of glass fibers from which the sizing was removed, having a bore with a nominal diameter of 1.0 mm and an outer diameter of 1.5 mm is advanced. The rate of flow of solution to the nozzle is adjusted so that the solution is flowed upon and around the periphery of the braid over a coating distance of 3 mm (0.125 inch). The braid, coated with the solution is then pulled through a sizing die having a diameter of 1.85 mm, then led into a coagulation tank where the polymer solution is coagulated in water to afford a semipermeable membrane about 0.05 mm thick, supported on the tubular braid which assumes an essentially circular cross-section. The braided membrane has an essentially circular bore having an i.d. of 1.0 mm and an o.d. of 1.58 mm. It is taken up onto the reel of a winder. In tests, it is found that the braided MF membrane provides excellent results.

This braided MF membrane was then immersed in boiling water (100° C.) for 1 hr, cooled to room temperature and re-tested. The water permeability was found to be unchanged, namely 508.3 LMH at 200 kPa (15 psig). This provides evidence that there was no shrinkage of the pores in the film.

A photograph of a cross-section of the braided MF membrane, made with an electron microscope, shows the film membrane overlying the braid to be about 0.05 mm thick and the braid is not embedded in the film. The thickness of the skin 35, and each individual layer 36–38 will depend upon the conditions under which the film is made. Measurements made in a vertical plane through the circumference, across the wall of the film, provides the following data on pore sizes:

| Section | μm |
| --- | --- |
| Skin thickness | 0.8 |
| Outer layer 36 | 0.781 |
| Intermediate layer 37* | 3.9 |
| Inner layer 38* | 14–32 |

*average pore size

The braided membrane was used to form a MF filtration module having a construction described in U.S. Pat. No. 5,248,424 to Cote et al. The water permeability measured under 67 kPa (5 psi suction pressure) and 22° C. is found to be 170 LMH (100 USgfd).

EXAMPLE 2

Making the hollow fiber membrane of tubular braid—a UF membrane

A dope similar to the PVDF-in-NMP solution used hereabove except with a sulfonated polysulfone hydrophilic additive, and having a viscosity of 91,000 cps is fed to a nozzle through which a tubular braid having a bore with a nominal i.d. of 1.0 mm and an o.d. of 1.5 mm is advanced. As before, the of flow of dope adjusted so that the solution is flowed upon and around the periphery of the braid over a coating distance of 3 mm (0.125 inch). The braid, coated with the solution is then pulled through a sizing die having a diameter of 1.95 mm, then led into a coagulation tank where the polymer solution is coagulated in water to afford a thin semipermeable membrane 0.05 mm thick, supported on the braid. The braided membrane UF membrane has an essentially circular bore with an i.d. of 1 mm and an o.d. of 1.58 mm. It is taken up onto the reel of a winder. In tests, it is found that the braided UF membrane provides excellent results.

A photograph of a cross-section of the braided UF membrane, made with an electron microscope, shows the film membrane overlying the braid which is not embedded in the film. Measurements made in a vertical plane through the circumference, across the wall of the film, provides the following data for pore sizes:

| Section | μm |
| --- | --- |
| Skin thickness | 2–3 |
| Outer layer 35* | 0.8 |
| Intermediate layer 36* | 8. |
| Inner layer 37* | 12–100 |

*average pore size

EXAMPLE 3

Making the hollow fiber membrane of tubular braid—a RO membrane

In a manner analogous to that described hereinabove in Examples 1 and 2, a dope of polysulfone in DMF with a polyvinyl pyrrolidone (PVP) pore former, viscosity 95,000 cps, is fed to a coating nozzle while a tubular braid having a bore diameter of 0.25 mm and an o.d of 0.8 mm is advanced through the nozzle. The braid is coated as described in the examples hereinabove and pulled through a sizing die having a 1.3 mm opening to afford a dope-coated braid which was coagulated in a water bath to yielded a RO membrane having an i.d. of 0.25 mm and an o.d. of 1.05 mm.

The braided membrane was used to form a RO filtration module having essentially the same detailed construction as the modules constructed in Examples 1 and 2.

Test for Compression Pressure at which flux decreases:

A test for the pressure which the fiber can withstand is conducted by immersing the fiber in a pressurizable tank and raising the pressure every 20 min by 200 psi. The flux (permeate flow) is constantly monitored. Since it is known that flow of permeate is directly proportional to the pressure applied, when the flux has a straight line relationship with pressure, it is evidence that the fiber has not been compressed enough to affect permeability. When the flux flattens out, failure due to compression is deduced. The flux (deionized water) measured at 1480 kPa (200 psig) and 22° C. is found to be 476 LMH (280 USgfd); and at 2860 kPa (400 psi) is 952 LMH (560 USgfd), indicating a straight line relationship. The flux flattened out at 9750 kPa (1400 psig) indicating the braided membrane had a compression pressure of 9750 kPa (1400 psig).

EXAMPLE 4

Comparison with self-supporting fiber made without the braid

In a manner analogous to that described in Example 3 above, but using a bore fluid for support, the same dope was used to form a hollow fiber with no solid support, but the wall was made 0.4 mm thick to be self-supporting. This is about the minimum wall thickness which provides a self-supporting fiber which has a substantially circular cross-section. Experience indicates that the pore diameters in the wall of the unsupported fiber will be smaller when compared to pores in the thin film made in Example 3. Since there is no practical way to make an un-supported tube having a thickness of 0.1 mm, the comparison is made with one which was 0.4 mm.

The same compression test was run with the unsupported fiber and it was found that the permeability at 1480 kPa (200 psig) is only 115 LMH (68 USgfd). In the compression pressure test, the flux flattened out at 1045 kPa (600 psig). The comparison shows that failure of the unsupported tubular film under compression occurred at less than one-half the compression pressure for the supported fiber of Example 3.

EXAMPLE 5

Microfiltration of contents of an activated sludge bioreactor

The pressure on the outer surface of braided membranes in a module constructed as described above is 136 kPa (5 psig). The temperature of the feed is 35° C. and the feed contains 35,000 mg/L of suspended solids including live cells predominantly of Pseudomonas bacteria in the size range from 1 μm to 2 μm, and some Lactobacilli which are smaller, about 1 μm long, 0.5 μm in nominal diameter. The stable flux obtained is in the range from 25–30 LMH.

EXAMPLE 6

Ultrafiltration of Oily Water

The pressure on the outer surface of braided membranes in a module 25 cm in diameter (outside of wafer holding the braided membranes) constructed as described in U.S. Pat. No. 5,232,593 to Pedersen et al, is 240 kPa (20 psig). The temperature of the feed is 30° C. and the feed contains 0.25% by weight of emulsified used engine oil from an automobile. The feed is flowed through the module at a rate of 9 L/min. The stable flux obtained is in the range from 28–40 LMH.

EXAMPLE 7

Desalination by Reverse Osmosis

A module constructed with a braided fiber RO membrane, as described above, may be operated in a range as high as 8370–10,440 kPa (1200–1500 psig) for optimum rejection if a relatively low flux in the range from 1.53–2.9 LMH (0.9–1.7 USgfd) is acceptable. For a higher flux a lower pressure may be used with a thinner-walled membrane. In a particular instance, a saline water feed pressure of 4240 kPa (600 psig) on the outer surface of the RO braided membranes in the module at a temperature of 20° C., with the feed containing 5,000 ppm NaCl results in a rejection of 87.5% NaCl at a flux of 9.35 LMH (5.5 USgfd).

EXAMPLE 8

Making another MF membrane of tubular braid

In a manner analogous to that described hereinabove in Example 3, a dope of PEEK in sulfuric acid is fed to a coating nozzle onto a braid with an i.d. of 0.25 mm and an o.d. of 0.8 ram. The dope-coated membrane is pulled through a sizing orifice having a dia. of 1.45 mm. The membrane formed has an o.d. of 1.03 mm. Tested at 40° C. and 260 kPa (20 psig) it provided a flux of 214 LMH (126

USgfd).

Most preferred are braided membranes which have a flux with deionized water of at least 10 LMH at 200 kPa (15 psig) measured at 20° C.

Note that all the Hayano et al membranes were made with an acrylonitrile copolymer which is unusable for a braided membrane of this invention. Moreover, though not stated by them, their membrane was meant to be used as a pervaporation membrane. For this purpose, the spinning nozzle they used was unable to coat only the surface of the membrane with the dope. In this context, it is more readily seen how they missed the significance of applying a thin film of a polymer which did not contain an acrylonitrile repeating unit, only to the outer surface.

Having thus provided a general discussion, described the overall process in detail and illustrated the invention with specific examples of the best mode of making the braided fiber membrane and purifying water with a module containing the membranes, it will be evident that the invention has provided a surprisingly effective solution despite the teachings of the art. It is therefore to be understood that, no undue restrictions are to be imposed on the scope of this invention by reason of the specific embodiments illustrated and discussed, and, particularly that the invention is not to be restricted to a slavish adherence to the details set forth herein.

We claim:

1. An outside-in hollow fiber asymmetric membrane comprising,
   (i) a macroporous foraminous tubular support means having an outer circumferential surface; and,
   (ii) a semipermeable membrane comprising a tubular film of a synthetic resinous material substantially free of acrylonitrile repeating units, said film having a wall thickness in the range from 0.01 mm to 0.1 mm, supported on said foraminous tubular support, on the outer circumferential surface thereof, having a major portion of the area of the circular cross-section of said foraminous tubular support, viewed along the longitudinal central axis, free from film and without said support being embedded in said film, said film having an annular peripheral barrier layer or "skin" circumferentially integral with successive microporous layers in said film, each layer contiguous with a preceding layer, said layers including an outer annular layer, an intermediate transport layer, and an annular inner layer.

2. The semipermeable membrane of claim 1 wherein said outer annular layer is contiguous said annular intermediate transport layer and circumferentially integral therewith, and said intermediate transport layer in turn, is contiguous said annular inner layer and circumferentially integral therewith.

3. The semipermeable membrane of claim 1 wherein said tubular support means is a flexible support means.

4. The semipermeable membrane of claim 3 wherein said flexible support means is a tubular braid having an essentially circular cross-section and a wall thickness at least twice that of said tubular film; and, said tubular film is supported on said braid having voids non-uniformly shaped by "ends" from which said braid is made, said voids being small enough to inhibit substantial penetration of a polymer solution from which said film membrane is formed.

5. The semipermeable membrane of claim 4 wherein said skin is in the range from 50 Å to 5 μm thick; said outer layer has pores in the range from about 200 Å to 2μ; said intermediate layer has pores in the range from about 0.1μ to about 7μ; said inner layer has pores in the range from about 5 μm to about 300 μm.

6. The semipermeable membrane of claim 5 wherein said braid is made from ends having a diameter in the range from about 0.05 mm to 0.5 mm.

7. The semipermeable membrane of claim 5 wherein said braid has an outside diameter in the range from about 0.6 mm to 2.5 mm; and an inside diameter in the range from about 0.25 mm to 2.3 mm.

8. The semipermeable membrane of claim 7 wherein said film is derived from a polymer having a number average molecular weight lower than $10^6$ and is selected from the group consisting of polysulfones, sulfonated polysulfone, blends of polysulfones and sulfonated polysulfone, polyether sulfone, polyether ether ketone, cellulose acetate, cellulose nitrate, cellulose butyrate, polystyrene, and fluoropolymers, and said polymer extends over less than 33% of the outer portion of said braid's cross-sectional area viewed along the longitudinal central axis.

9. The semipermeable membrane of claim 7 wherein said polymer is essentially insoluble in water and said membrane has an initial room temperature flux of at least 10 LMH measured with deionized water at a pressure of 200 kPa and 20° C.

10. The semipermeable membrane of claim 9 wherein said film is formed from a polymer solution having a viscosity in the range from about 300 cp to about 200,000 cp at 22° C.

11. The semipermeable membrane of claim 7 wherein said braid is knitted or woven from ends having a diameter in the range from about in the range from about 0.05 mm to 0.5 mm, and said braid has from 5 to 50 picks/25.4 mm.

* * * * *